Dec. 11, 1945.   R. J. McNITT   2,390,548
METHOD OF OPERATING ELECTROLYTIC CELLS
Filed Oct. 15, 1941
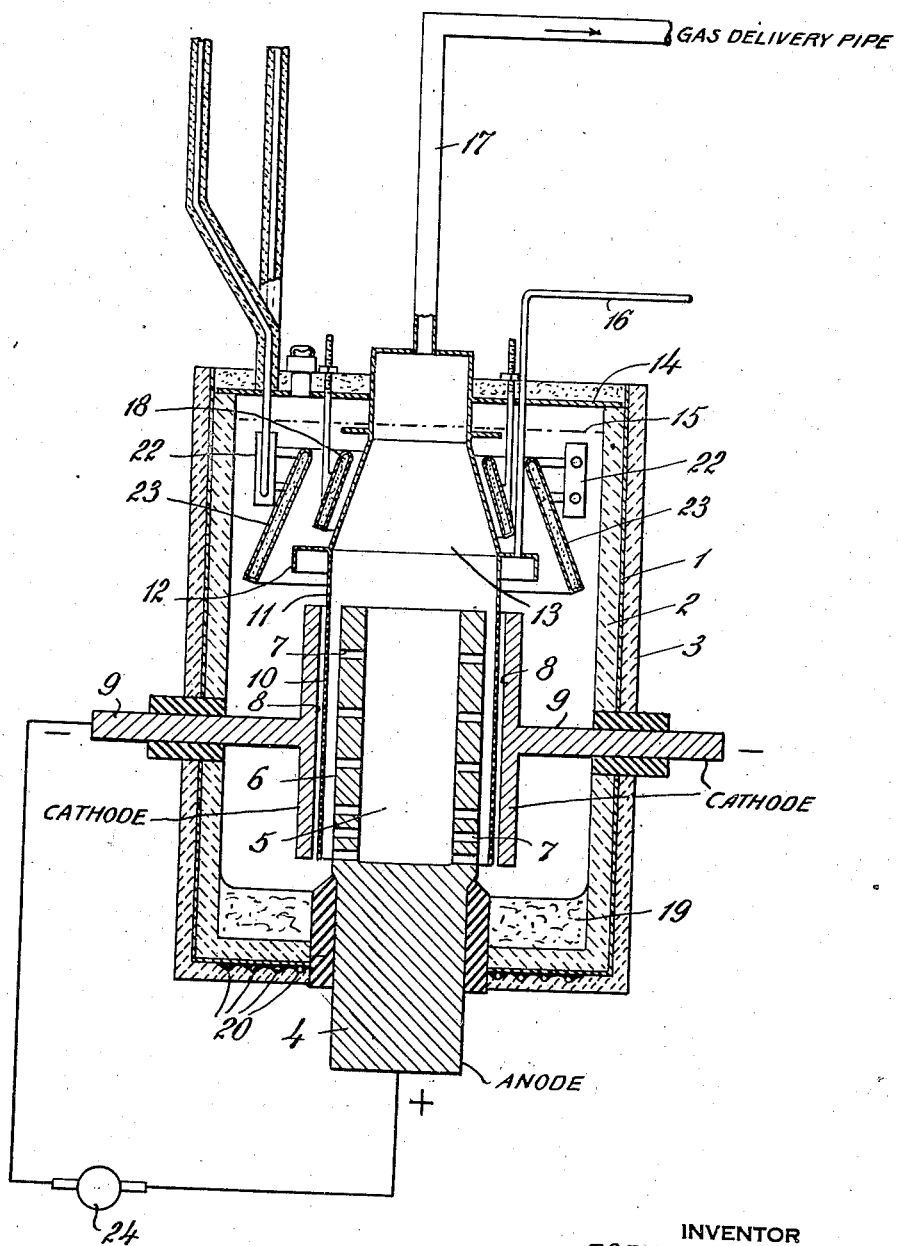
INVENTOR
ROBERT J. McNITT
BY
Pennie, Davis, Marvin & Edmonds
ATTORNEYS Patented Dec. 11, 1945

2,390,548

UNITED STATES PATENT OFFICE 2,390,548

METHOD OF OPERATING ELECTROLYTIC CELLS

Robert J. McNitt, Perth Amboy, N. J.

Application October 15, 1941, Serial No. 415,092

3 Claims. (Cl. 204—68)

This invention relates to the electrolysis of fused salt baths. The invention aims to provide certain improvements in the operation of cells of the general type which have the active anode surface extending to a point near the bottom of the cell and especially those cells in which the conductors which carry electricity to and from the electrodes pass through the lower part of the cell, as through the bottom or the lower side walls. The invention is also applicable to those operations which are adversely affected by the presence of soluble oxygen-bearing impurities in the fused electrolyte.

Due to the fact that cool fused electrolyte is more dense and has a higher electrical resistance than hot electrolyte, there is a natural tendency for the cool electrolyte to settle around the lower parts of the electrode surfaces and reduce the flow of electric current between the lower parts of these surfaces, which in turn results in the reduction of the amount of heat liberated between the lower part of the electrode surfaces, and the electrolyte adjacent these surfaces becomes cooler. Furthermore, the conductors which feed electric current to the electrodes conduct a considerable amount of heat away from the lower part of the electrodes, when these conductors pass through the bottom or lower side walls of the cell. Films of frozen electrolyte form on the lower parts of the electrode surface, resulting in a still greater increase in the electrical resistance and a further reduction in the electric current flowing between the lower electrode surfaces. Eventually the electrolyte adjacent the lower part of the electrodes becomes mushy with congealing of the liquid and the formation of crystals and circulation of the electrolyte around the lower part of the electrodes practically ceases. On account of these natural tendencies, it has been found necessary to employ a high density of current flow between the electrodes, resulting in a high cell voltage and waste of electrical energy with the formation of a great deal of heat which must be dissipated. In cells of this kind it has been considered impossible to reduce the cell voltage.

One aim of my invention is to provide an improved method of operation whereby the operating cell voltage is reduced and a corresponding saving made in the consumption of electric energy.

A new cell operates with higher energy efficiency than an old cell and requires a greater flow of electric current between the electrodes to maintain thermal equilibrium. The term "new cell," as used herein, means a cell having perfect electrodes, such as new electrodes, and a bath of electrolyte in which there is no accumulation of harmful impurities. In service, the active surface of the anode loses its original form due to corrosion and erosion and there is an accumulation, more or less, of harmful impurities which interfere with the efficiency of the process. Thus as the cell ages it operates with lower energy efficiency and if the density of flow of electric current be maintained at the same point as when the cell was new, there will be an increasing amount of heat generated which must be dissipated.

It is customary to operate many cells in series electrical connection and the electric current which flows through the series circuit must be of sufficient intensity to satisfy the demands of the newest and most efficient cell in the circuit. Since this series current is greater than is required to maintain the older less efficient cells in thermal equilibrium, there are excessive energy losses in all of these cells and these losses are still greater the higher the intensity of current flow which is employed in the newest cell.

It is an object of this invention to provide an improved method of operation for increasing the energy efficiency by preventing these excessive losses when the operation is carried on in a plurality of cells connected together in series.

It has also been found that although the yield of metal is high in these cells for a time after they are put into operation, it gradually declines to less than half of its original value. Since the cost for electricity, labor and maintenance does not decrease with the yield, the unit cost of production shows a large increase. It is another aim of my invention to provide an improved method of operation whereby such a decline in yield with increased costs may be prevented.

I have found that if the electric current flowing between the anode and cathode be increased to a sufficient intensity under suitable conditions, the yield of metal stops declining and gradually increases until it again reaches a high value.

I believe that the declining yield is due at least in part to the accumulation of oxygen-bearing impurities in the cell and that under the influence of the increased current these impurities are eliminated by a chemical reaction between the carbon at the lower part of the anode surface and oxygen set free at said surface, with the formation of stable gaseous compounds which are discharged from the cell with the other anode gas. When the yield has been restored to a high value, the flow of electric current can be reduced to normal and kept there for a considerable time before the yield again declines to the point where it becomes economically advantageous to apply the increased flow of current again.

The length of the interval between applications of increased current depends on a number of factors, such as the rate of admission of impurities to the electrolyte and the rate of diffusion of the electrolyte between the anode and cathode compartments.

I have noticed that after restoring the yield by increasing the flow of electric current, the cell voltage with normal current flowing is considerably lower than it was before the application of the increased flow of current, and have found that under the flow of normal current, the electrolyte adjacent the lower anode surfaces and in the passages at the base of the anode is often in a solid or mushy semi-solid condition, whereas after the application of the increased flow of current the electrolyte is very fluid. I believe that the decrease in cell voltage is due to this change in condition of the electrolyte. In view of these facts, I have found it to be economical to increase the flow of current above the normal current from time to time, even though the yields are entirely satisfactory.

If at any time the cell voltage seems too high with normal current, or if an examination shows that the electrolyte at the lower part of the anode is not fluid, I apply an increased flow of current until the electrolyte adjacent the lower anode surfaces and in the passages at the base of the anode is in a fluid condition and the voltage of the cell is reduced to a value which is reasonable considering the age of the cell and its past history.

By way of illustration, I shall describe my invention as applied to the production of sodium and chlorine by the electrolysis of a fused mixed bath of sodium chloride and calcium chloride.

The accompanying drawing is a sectional view taken vertically through the center of a cell suitable for practicing the invention.

The electrolytic cell comprises a steel cell container 1 lined with refractory 2 and covered with thermal insulation 3. Through the bottom of the cell passes a cylindrical carbon anode 4 with hollow interior 5 connected with its outer active surface 6 by openings 7. Surrounding anode 4 is an annular steel cathode 8 supported from the cell wall by arms 9 which also serve to conduct the electric current through the cell walls. Between the anode and cathode perforated diaphragm 10 is suspended from steel collecting device 11 comprising sodium collecting hood 12 and chlorine collecting hood 13. These hoods are supported from the cell cover 14 by rods (not shown). In operation, the cell is filled with the fused bath to the level 15 and electric current passed between the active anode surface 6 and the active cathode surface 8. Liquid sodium rising from the cathode is collected under hood 12 and by reason of its low specific gravity flows out of the cell by duct 16. Chlorine gas liberated at the anode surface 6 passes up through chlorine collector 13 and is discharged through duct 17.

Assuming that this cell is a new cell with the anode surface in its original condition and with practically no accumulation of impurities, the intensity of flow of the electric current between the electrodes is made such that the mean current density between the anode and cathode is about six amperes per square inch and this current, which I shall designate as the normal current, is somewhat less than that which is required to prevent the electrolyte from congealing and obstructing the passages 7 at the bottom of the anode. The cell voltages with normal current flowing and the electrolyte in a fluid condition at the bottom of the electrolyte is about six volts varying with the temperature of the electrolyte in the zone of electrolytic action, and increasing gradually as the anode surface wears away and the distance between the electrodes increases.

If the cell voltage increases abnormally in view of the temperature of the electrolyte and the time the cell has been in service, or if it is found by trial or by judgment of the operator based on past performance that the passages 7 at the bottom of the anode are obstructed by frozen electrolyte, the flow of current is increased for a short time until the electrolyte is fluid in the passages 7 at the lower part of the anode.

If the yield of sodium and chlorine produced falls off and no other cause for this decline is found, the flow of current between the electrodes is increased until the mean current density is about eight and one-half and the current is kept above normal until the yield is restored to a satisfactory value. The amount by which the normal current must be increased to clear obstructions of frozen electrolyte from the passages in the lower part of the anode and to restore the yield, depends on the size of the cell, the proportions of its parts, its age and condition. The cell voltage and the temperature at the base of the anode indicate the condition of the electrolyte at the bottom of the anode, and the amount of carbon monoxide and the chlorides of silicon and aluminum in the gases discharged from the anode compartment indicates whether the lower part of the anode surface is sufficiently active to facilitate the elimination of oxygen-bearing impurities.

The amount of increase in current intensity required to render the anode surface active to oxygen depends on the arrangement of the anode parts, the proportions of the carbon conductor supplying current to the anode, the amount of water cooling applied to the anode conductor, the temperature of the electrolyte in the anode compartment and the effectiveness of circulation of the stream to the lower part of the anode. However, an experienced operator can decide without any complicated analysis when it is advantageous to apply the increased current, how much the increase should be and how long it should be continued. The intervals between applications of the increased current may be increased by operating the anode stream of electrolyte at a high temperature as by adjusting the position of insulating baffle 18, thereby controlling the circulation between this baffle and the hood 13 and so controlling the heat dissipated through this hood from the electrolyte inside this hood, as disclosed in my copending application, Serial No. 401,891, filed July 11, 1941.

In heating the electrolyte at the bottom of the anode by increasing the current flow, it is advantageous to avoid overheating the electrolyte in the sump 19 as impurities precipitated therein may pass into solution and circulating with the electrolyte through the zone of electrolytic action may destroy the yield and render much more difficult and expensive the operation of eliminating impurities by increasing the flow of current as described hereinabove. To avoid this, I prefer to control the temperature in the sump by cooling surfaces 20 at the bottom of the cell. The temperature of the cooling surfaces 20 may be controlled by circulating a fluid at the desired temperature through tubes. I may also control the temperature of the descending cathode stream by cooling surfaces 22 and baffle 23 located in the upper part of the cell as described in my copending application, Serial No. 305,211, filed November 18, 1939.

It is customary to operate a number of cells in series electrical connection and the series electric current flowing through all of the cells becomes the normal current for the individual cells. In accordance with my invention this current is adjusted at such an intensity of flow as will be too small to maintain the lower part of the anode of the newest and most efficient cells in an active condition. When the operator finds evidence that the electrolyte at the bottom of the anode in any cell is no longer fluid, or when he decides that a decline in the yield of sodium and chlorine in a cell can be improved by increasing the activity of the lower part of the anode surface, he connects small portable auxiliary electric generators 24 to the anodes and cathodes of these cells and in this manner feeds additional current to these cells individually and in accordance with their respective needs.

Although my invention is intended primarily for application to the cells in accordance with their individual needs, there are certain circumstances in which it may be applied to a group of cells simultaneously. For example, where the cells are fairly uniform in age and operating characteristics and where there is no severe penalty for temporary increase in the demand for electric power and where there is available sufficient overload capacity in the electric equipment, it will be found advantageous to adjust the normal series current at such a reduced value during most of the time that the lower surfaces of the anode cannot be maintained active, and to increase the current at intervals to restore the electrolyte at the bottom of the anodes to a fluid condition and to prevent the accumulation of harmful oxygen-bearing impurities. But even when the method of operation is adopted, it will still be found advantageous to apply additional current to the cells individually as may be required.

Although my improved method permits the use of a much lower current density than has been practiced heretofore, it does not necessarily imply a reduction in product per cell since it is practicable to use higher electrodes with my method of operation and thus increase the production per cell notwithstanding the low current density.

I claim:

1. In the operation of a plurality of electrolytic cells in a series electric circuit in the electrolysis of fused salt baths in which each cell has an anode with a portion of the active surface thereof near the bottom of the cell and heat conducting means extending through the cell to the outside through which there is a loss of heat from the anode, the improvement which comprises supplying all the cells of the series circuit with such low series electric current that insufficient heat is generated to maintain the lower active portions of the anodes of all the cells free of frozen electrolyte with the result that the lower portion of the anode of at least one cell becomes covered with frozen electrolyte due to a loss of heat from the anode, applying a supplemental electric current to any cell of the series circuit which has electrolyte frozen on the lower active anode surface until the frozen electrolyte has melted, and then discontinuing the supplemental electric current while continuing to operate all the cells with the low electric current.

2. In the operation of a plurality of electrolytic cells in a series electric circuit in the electrolysis of fused salt baths in which each cell has a carbon anode with a portion of the active surface thereof near the bottom of the cell and heat conducting means extending through the cell to the outside through which there is a loss of heat from the anode, the improvement which comprises supplying all the cells of the series circuit with such low series electric current that insufficient heat is generated to maintain the lower active portions of the anodes of all the cells free of frozen electrolyte with the result that the lower portion of the anode of at least one cell becomes covered with frozen electrolyte due to a loss of heat from the anode, applying a supplemental electric current to any cell of the series which has electrolyte frozen on the lower anode surface until the frozen electrolyte has melted, continuing to apply the supplemental current until the lower active anode surface becomes sufficiently heated to react with oxygen contained in the electrolyte and diminish the oxygen therein, and then discontinuing the supplemental current while continuing to operate all the cells with the low electric current.

3. In the operation of a plurality of electrolytic cells in a series electric circuit in the electrolysis of fused salt baths in which each cell has a carbon anode with a portion of the active surface thereof near the bottom of the cell and heat conducting means extending through the cell to the outside through which there is a loss of heat from the anode, the improvement which comprises supplying all the cells of the series circuit with such low series electric current that insufficient heat is generated to maintain the lower active portions of the anodes of all the cells at such temperature that oxygen liberated at the lower active anode surface reacts with the carbon thereof with the result that at least one cell has such a low temperature that the said oxygen does not react with the carbon of the lower active anode surface and the oxygen accumulates in the electrolyte reducing the yield of the cell, applying supplementary electric current to such cell until the anode becomes sufficiently heated at the lower active surface to react with the oxygen forming gases which carry the oxygen from the electrolyte, continuing to apply the supplemental current until the yield of the cell has increased to its satisfactory normal rate, and then discontinuing the supplemental current while continuing to operate all the cells with the low electric current.

ROBERT J. McNITT.